366-279 SR
1/5/87 KR RE 32,324

United States Patent [19]
Kedem

[11] E Patent Number: Re. 32,324
[45] Reissued Date of Patent: Jan. 6, 1987

[54] MIXING DEVICE

[76] Inventor: Abraham Kedem, 42 Weizmann St., 76283 Rehovot, Israel

[21] Appl. No.: 796,694

[22] Filed: Nov. 12, 1985

Related U.S. Patent Documents

Reissue of:
[64] Patent No.: 4,536,092
Issued: Aug. 20, 1985
Appl. No.: 610,835
Filed: May 16, 1984

[30] Foreign Application Priority Data

Jun. 1, 1983 [IL] Israel ..... 68842

[51] Int. Cl. ..... B01F 5/12
[52] U.S. Cl. ..... 366/265; 366/279; 366/328; 366/343
[58] Field of Search ..... 366/101, 107, 262–265, 366/278, 315–317, 241, 247, 278, 279, 328, 342–344; 261/84, 91, 92

[56] References Cited

U.S. PATENT DOCUMENTS 836,717 11/1906 Trent ..... 366/265

OTHER PUBLICATIONS

Scientific American, "The Large—Scale Cultivation of Mammalian Cells," J. Feder and W. Tolbert, pp. 24–31, vol. 248, No. 1, Jan. 1983.

*Primary Examiner*—Timothy F. Simone
*Attorney, Agent, or Firm*—Fleit, Jacobson, Cohn & Price

[57] ABSTRACT

There is provided a mixing device for low velocity and low shear mixing. The device is of special value for mixing of delicate materials, such as cell suspensions, microspheres and the like, as used in fermentors and the like. The device is based on the suction effect obtained by low velocity rotation of a cylinder provided with tangential openings.

31 Claims, 4 Drawing Figures

MIXING DEVICE

Matter enclosed in heavy brackets [ ] appears in the original patent but forms no part of this reissue specification; matter printed in italics indicates the additions made by reissue.

BACKGROUND OF THE INVENTION

Various drugs, biochemicals, antibiotics and the like are produced on a large scale in industrial fermentation plants. Fermentors are the basic tool in such production processes, and in most processes the content of the fermentor must be agitated and thoroughly mixed. Nowadays there is generally used a stirred baffled upright cylindrical fermentation vessel provided with central agitation means. The agitator is used for dispersing incoming air in the reaction or culture medium in the form of fine bubbles. Such bubbles must be moved from the area of the impeller to other regions of the fermentor. When used in systems comprising microorganisms, fungi, etc. the agitation attained mixing of same with the nutrient medium and causes local turbulence, causing adequate turbulence to prevent the dispersion from settling.

For this purpose different types of stirring means are used, mainly impellers with flat stirring paddles, or marine-blade impellers when reduced shear stress is required, usually with baffles around, for increasing turbulence and to prevent swirling of the culture medium.

The main drawback of the known systems is that when a dispersed phase is suspended, or in rise, or fall, the mass transfer coefficient are almost completely unaffected by mechanical power.

Little advantage can be gained by increasing the agitation intensity above the point at which the particles are freely suspended, while impellers should secure suspension of particles, thorough mixing, minimum shear and minimum power consumption.

It was found that the most economic use of power consumption for dispersion is obtained by small low-drag impellers, but this diminishes the rate of dispersion. Even with high speed impellers there occur stagnant regions above the impeller and below it and in the vicinity of the baffles. As the viscosity of the fluid increases, there will be a decrease of fluid velocities and the stagnant zone will increase in size.

Moreover, the tip speed of the impeller causes considerable cell damage and the shearing action occurs around the whole impeller. In many systems changes occur in rheological properties during the course of fermentation, influencing the degree of agitation and mixing, increasing power consumption.

SUMMARY OF THE INVENTION

The present invention relates to a novel mixing device, for low velocity mixing with low shear, adapted especially for use in fermentation and similar processes. The novel mixing device attains a thorough mixing by mass transfer, with little agitation. Amongst the advantages of the novel device are its simplicity and low cost, as well as its low power consumption and minimum shear.

The novel device comprises a cylindrical member closed at one end and open at the other, provided with means for rotating same about its axis at a preferred velocity, tangentially confined vents being provided in the side-walls of said cylinder. According to another embodiment at the closed end of the cylinder there are two or more openings, parallel to the radial plane of the main cylinder. The cylinder may be rotated mechanically by means of a central rod, which may be solid or hollow, or it can be actuated from the outside of the vessel of the mixed medium by magnetic means. The central rod can be provided with holes for the insertion of bubbles of gas into the liquid.

In use, the cylinder is immersed into the medium which is to be dispersed and by means of the central rod of magnetic drive, rotated about its axis. The direction of the rotation is such, that the said lateral openings face to the rear of the direction of rotation. When the cylinder is rotated, even at a low velocity of rotation, a pressure drop occurs at the openings of the vents, caused by the inertia of the liquid, thus creating a powerful suction effect. A velocity of rotation of 10 to 50 RPM is adequate for an efficient mixing in most systems, whereas in conventional mixing devices a speed rotation of about 100 to 2000 RPM is generally required. When the novel device is rotated, the whole mass of the ambient medium contained in the vessel is circulated through the device and intimate mixing is attained. When the vertical shaft used for rotation is hollow, introduction of a gaseous medium into the fermentation broth is especially efficient, since the introduced bubbles are carried first downwards from the top of the cylinder and only afterwards, after passing the vents, may rise with the liquid returning again into the cylinder. The efficient mixing is obtained by circulation of the whole mass through the cylinder and with slow rotation and by absence of moving blades cells grown on microcarriers are not detached and damage to fragile cells is obviated.

The novel device is illustrated with reference to the enclosed schematical drawings, which are not according to scale and in which.

Figure 1:
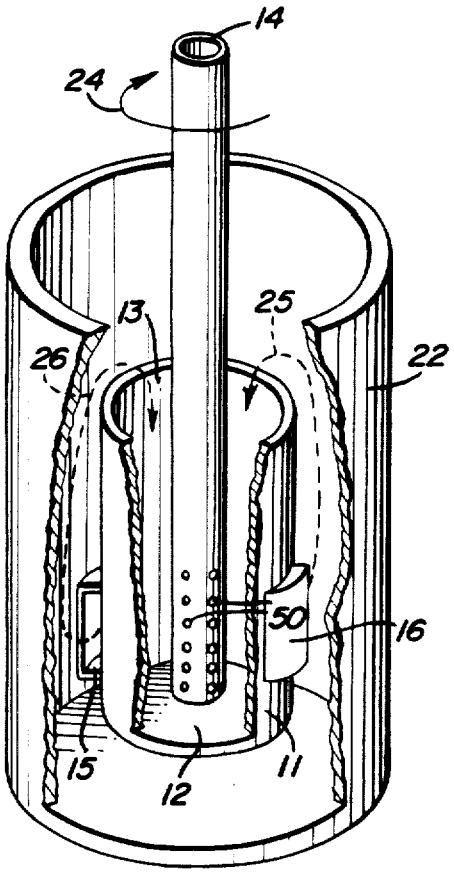
FIG. 1 is an elevational view of a device, located in the center vessel.
Figure 2:
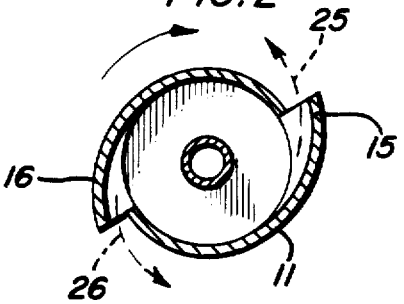
FIG. 2 is a sectional view through the cylinder of FIG. 1.

As shown in FIG. 1 and FIG. 2, the device according to the invention comprises an upright cylindrical member 11, closed at its lower end 12 and open at its upper end 13, a rod 14 being provided axially in said cylinder 11, and attached to its lower wall 12, two vents 15 and 16 being provided at the lower part of the cylinder 11. Holes 50 are provided in rod 14 for introduction of gas into the cylinder 11. The mixing device is positioned in a vessel 22 and the liquid is introduced into the vessel 22 so as to extend up to and above the upper end of the cylinder 11. When used for mixing, the shaft 14 is rotated in the direction of the arrow 24, so that the openings of the vents face rearwards respective the direction of rotation. Arrows 25 and 26 show the flow pattern of the circulating mixture.

Figure 3:
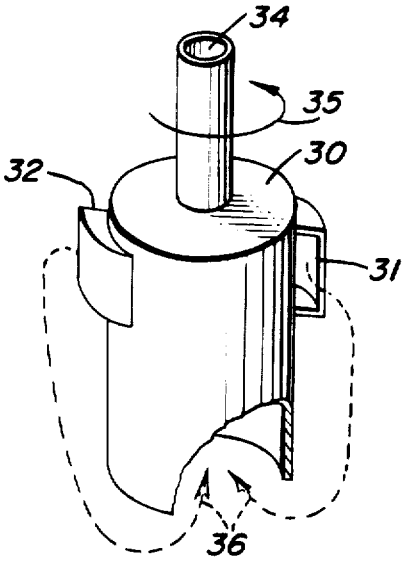
FIG. 3 is a perspective view of a different embodiment of the mixing device according to the invention.

As shown in FIG. 3, a different embodiment of the device according to the invention comprises a cylinder shaped member 30, closed at its upper end and open at its lower end. At the support part on the circumference of the cylinder 30 there are provided two openings 31 and 32, diametrically opposite each other and facing in the same direction. A rod or hollow shaft 34 is arranged axially in the cylinder 30. When used for mixing, the device is immersed in the vessel containing the system to be mixed, so that the level of the liquid extends above the upper end of the cylinder 30 and the device is rotated by means of shaft 34 in the direction of arrow 35.

Arrow 36 shows the pattern of the flow of the mixture. A thorough mixing is attained, but shear forces are very low and thus if the system contains delicate biological materials, such as cells on microcarriers, these are not damaged. Shear forces are small and correspondingly power consumption is low. Generally a rate of rotation of 10 to 50 RPM is adequate for thorough and efficient mixing.

Figure 4:
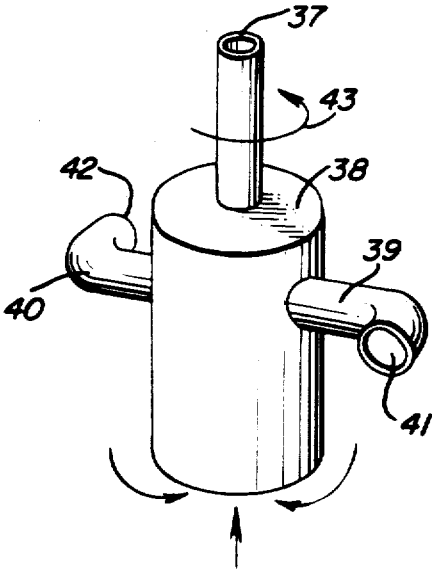
FIG. 4 is a perspective view of an embodiment with extended arms according to the invention.

As shown in FIG. 4, another embodiment of the device according to the invention comprises a cylinder shaped member 38 closed at its upper end and open at its lower end. At the upper part on the circumference of the cylinder 38 there are provided two radially or tangentially protruding tubular members 39 and 40 ending in two openings 41 and 42 diametrally opposite each other and facing in the same direction. A rod or hollow shaft 37 is arranged axially in the cylinder 38. When the cylinder is rotated by means of shaft 37 in the direction of arrow 43, a pressure drop occurs at the openings 41 and 42 providing a continuous flow of the medium to be mixed, out of said openings and returning through the lower open end of cylinder 38. The protruding arms may facilitate better mixing.

It is clear that the above description is by way of illustration only and that various modifications and changes in the structure and arrangements of the parts may be resorted to, without departing from the scope and spirit of the invention.

I claim:

1. A mixing device to be submerged in a liquid contained in a vessel for low velocity and low shear mixing of delicate materials, such as cell suspensions, microspheres and the like, said device comprising:
   - a cylinder open at one end and closed at the other end;
   - a cylindrical drive member coaxially mounted on said cylinder for rotating the cylinder about the longitudinal axis of said [tubular] *cylindrical drive* member;
   - at least two vent openings defined by the sidewall of said cylinder located in the same radial plane; and
   - a vent cover and flow director for each of said vent openings extending peripherally from one side of the vent opening outwardly around the periphery of said cylinder terminating radially spaced from the other side of the vent opening, said vent cover and flow director defining a radially extending liquid opening bounded on one side by the periphery of said cylinder and on all other sides by the terminal edges of said vent cover and flow director for moving said liquid from the interior of the cylinder through said at least two vent openings and its vent cover and flow director, axially along the periphery of said cylinder to said open end of the cylinder by a suction created at said liquid openings when said [tubular] *cylindrical drive* member is rotated at a speed in the range of 10 to 50 RPM.

2. A device according to claim 1, wherein said at least two vent openings and said vent cover and flow director are located at the lower part of the cylinder, said vent cover and flow directors being open towards the same circular direction, rearward the rotation of the cylinder.

3. A device according to claim 1, wherein said vent cover and flow directors, pointing in the same circular direction rearward the rotation of the cylinder, are provided in the upper part of the cylinder.

4. A device according to claim 1, wherein said cylindrical drive member extends above the upper level of the cylinder, and is attached thereto.

5. A device according to claim 1, wherein said cylindrical drive member is axially attached to the center of said cylinder, holes being provided in said cylindrical drive member within the confines of the cylinder, for circulating a gaseous medium through the liquid during a mixing process.

*6. A mixing device to be submerged in a liquid contained in a vessel for low velocity and low shear mixing of delicate materials, such as cell suspensions, microspheres and the like, said device comprising:*

*(a) cylinder means open at one end and closed at the other end to be submerged in a liquid contained in a vessel and to be rotated about its longitudinal axis;*

*(b) a tubular member coaxially mounted on said cylinder means and projecting into and terminating within said cylinder means for introducing gas into said cylinder means;*

*(c) at least two inner vent openings defined by the wall of the cylinder means, said inner vent openings being equally spaced about the periphery of the cylinder means and located in a common plane normal to the axis of the cylinder means; and*

*(d) a vent cover and flow director for each of said inner vent openings extending tangentially from the inner vent opening radially outwardly and peripherally of said cylinder means terminating in an outer vent opening located in an axial plane,*

*(e) said outer vent openings being equally spaced about the periphery of the cylinder means and lying in said common plane normal to the axis of the cylinder means, said outer vent openings facing in the same direction so that when the cylinder means is rotated at a speed in the range of 10 to 50 RPM with said outer vent openings facing rearwardly, liquid contained in a vessel in which the mixing device is submerged will flow from the interior of the cylinder means through said at least two inner vent openings, their vent covers and flow directors and exit through said outer vent openings tangentially with respect to said cylinder means due to a pressure drop occurring at the outer vent openings caused by the inertia of the liquid, thus creating a suction effect.*

*7. A mixing device as claimed in claim 6, wherein said vent covers and flow directors include tangentially protruding tubular members.*

*8. A mixing device as claimed in claim 7, wherein there are two of said tubular members.*

*9. A mixing device as claimed in claim 6 wherein each outer vent opening is defined between the wall of the cylinder means and the end of the vent cover and flow director.*

*10. A mixing device as claimed in claim 6 wherein the vent covers and flow directors are located nearer the closed end of the cylinder means.*

*11. A mixing device as claimed in claim 6 wherein the vent covers and flow directors are located nearer the open end of the cylinder means.*

*12. A mixing device to be submerged in a liquid contained in a vessel for low velocity and low shear mixing of delicate materials, such as cell suspensions, microspheres and the like, said device comprising:*

(a) cylinder means open at one end and closed at the other end to be submerged in a liquid contained in a vessel and to be rotated about its longitudinal axis; and (b) at least two tangentially extending vent means formed on the wall of the cylinder means, said vent means being equally spaced about the periphery of the cylinder means and located in a common plane normal to the axis of the cylinder means and terminating in vent openings, each vent opening terminated substantially in a plane intersecting the axis of the cylinder means (c) said vent openings facing in the same direction so that when the cylinder means is rotated at a speed in the range of 10 to 50 RPM with said vent openings facing rearwardly, liquid contained in a vessel in which the mixing device is submerged will flow from the interior of the cylinder means through said vent openings tangentially with respect to said cylinder means due to a pressure drop occurring at the vent openings caused by the inertia of the liquid, thus creating a suction effect.

13. A mixing device as claimed in claim 12, further comprising gas introducing means cooperating with said cylinder means for introducing gas into said cylinder means.

14. A mixing device as claimed in claim 12, wherein said vent means include tangentially protruding tubular members.

15. A mixing device as claimed in claim 14, wherein there are two of said tubular members.

16. A mixing device as claimed in claim 12 wherein each vent opening is defined between the wall of the cylinder means and the end of the vent means.

17. A mixing device as claimed in claim 12 wherein the vent means are located nearer the closed end of the cylinder means.

18. A mixing device as claimed in claim 12 wherein the vent means are located nearer the open end of the cylinder means.

19. An apparatus for low velocity and low shear mixing of delicate materials, such as cell suspensions, microspheres and the like, said device comprising:

(a) vessel for containing a liquid;

(b) cylinder means open at one end and closed at the other end for submersion in a liquid contained in said vessel and to be rotated about its longitudinal axis;

(c) a tubular member coaxially mounted on said cylinder means and projecting into and terminating within said cylinder means for introducing gas into said cylinder means;

(d) at least two inner vent openings defined by the wall of the cylinder means, said inner vent openings being equally spaced about the periphery of the cylinder means and located in a common plane normal to the axis of the cylinder means;

(e) a vent cover and flow director for each of said inner vent openings extending tangentially from the inner vent opening radially outwardly and peripherally of said cylinder means terminating in an outer vent opening located in an axial plane; and (f) said outer vent openings being equally spaced about the periphery of the cylinder means and lying in said common plane normal to the axis of the cylinder means, said outer vent openings facing in the same direction so that when the cylinder means is rotated at a speed in the range of 10 to 50 RPM with said outer vent openings facing rearwardly, liquid contained in said vessel in which the mixing device is submerged will flow from the interior of the cylinder means through said at least two inner vent openings, their vent covers and flow directors and exit through said outer vent openings tangentially with respect to said cylinder means due to a pressure drop occurring at the outer vent openings caused by the inertia of the liquid, thus creating a suction effect.

20. A mixing device as claimed in claim 19, wherein said vent covers and flow directors include tangentially protruding tubular members.

21. A mixing device as claimed in claim 20, wherein there are two of said tubular members.

22. A mixing device as claimed in claim 19, wherein each outer vent opening is defined between the wall of the cylinder means and the end of the vent cover and flow director.

23. A mixing device as claimed in claim 19, wherein the vent covers and flow directors are located nearer the closed end of the cylinder means.

24. A mixing device as claimed in claim 19, wherein the vent covers and flow directors are located nearer the open end of the cylinder means.

25. A mixing device for low velocity and shear mixing of delicate materials, such as cell suspensions, microspheres and the like, said device comprising:

(a) a vessel for containing a liquid;

(b) cylinder means open at one end and closed at the other end to be submerged in a liquid contained in said vessel and to be rotated about its longitudinal axis; and (c) at least two tangentially extending vent means formed on the wall of the cylinder means, said vent means being equally spaced about the periphery of the cylinder means and located in a common plane normal to the axis of the cylinder means and terminating in vent openings, each vent opening terminated substantially in a plane intersecting the axis of the cylinder means, (d) said vent openings facing in the same direction so that when the cylinder means is rotated at a speed in the range of 10 to 50 RPM with said vent openings facing rearwardly, liquid contained in said vessel in which the mixing device is submerged will flow from the interior of the cylinder means through said vent openings tangentially with respect to said cylinder means due to a pressure drop occurring at the vent openings caused by the inertia of the liquid, thus creating a suction effect.

26. A mixing device as claimed in claim 12, further comprising gas introducing means cooperating with said cylinder means for introducing gas into said cylinder means.

27. A mixing device as claimed in claim 12, wherein said vent means include tangentially protruding tubular members.

28. A mixing device as claimed in claim 14, wherein there are two of said tubular members.

29. A mixing device as claimed in claim 12, wherein each vent opening is defined between the wall of the cylinder means and the end of the vent means.

30. A mixing device as claimed in claim 12, wherein the vent means are located nearer the closed end of the cylinder means.

31. A mixing device as claimed in claim 12, wherein the vent means are located nearer the open end of the cylinder means.

* * * * *